(12) United States Patent
Isobe et al.

(10) Patent No.: US 9,275,075 B2
(45) Date of Patent: Mar. 1, 2016

(54) INFORMATION PROCESSING DEVICE, INFORMATION PROCESSING METHOD, INFORMATION STORAGE MEDIUM AND PROGRAM

(75) Inventors: Yoko Isobe, Tokyo (JP); Shigeru Enomoto, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 126 days.

(21) Appl. No.: 13/390,533

(22) PCT Filed: Apr. 19, 2010

(86) PCT No.: PCT/JP2010/056910
§ 371 (c)(1),
(2), (4) Date: Apr. 3, 2012

(87) PCT Pub. No.: WO2011/021408
PCT Pub. Date: Feb. 24, 2011

(65) Prior Publication Data
US 2012/0182314 A1    Jul. 19, 2012

(30) Foreign Application Priority Data
Aug. 18, 2009  (JP) ................................. 2009-188853

(51) Int. Cl.
*G06F 17/30* (2006.01)
(52) U.S. Cl.
CPC ...... *G06F 17/30244* (2013.01); *G06F 17/3028* (2013.01)
(58) Field of Classification Search
CPC .................... G06F 17/30817; G06F 17/30749; G06F 1/30817; F06F 17/30749; H04L 67/2842; H04L 65/4084; H04L 67/1097; H04L 67/12; H04L 67/125
USPC ........... 345/619; 715/741; 709/201, 217–219, 709/250
See application file for complete search history.

(56) References Cited

U.S. PATENT DOCUMENTS 6,947,896 B2 *  9/2005  Hanson .......................... 704/270
7,613,737 B2   11/2009  Ozaki
(Continued)

FOREIGN PATENT DOCUMENTS

CN          1955908 A       5/2007
CN        101308692 A      11/2008
(Continued)

OTHER PUBLICATIONS

English machine translation of applicant provided Japanese patent publication No. JP-2009-181464.*
(Continued)

*Primary Examiner* — Maurice L McDowell, Jr.
(74) *Attorney, Agent, or Firm* — Matthew B. Dernier, Esq.

(57) ABSTRACT

To provide an information processing device, an information processing method, an information storage medium, and a program capable of providing information and executing a processing according to a situation in which content is used. A channel data obtaining unit obtains content-corresponding images corresponding to a plurality of respective contents. An index screen image producing and outputting unit outputs a screen image showing a picture in which the respective content-corresponding images are placed according to a rule determined based on data that is updated upon use of the respective contents. An index-object-related processing executing unit executes, upon receipt of selection of the content-corresponding image, a processing that corresponds to a content-corresponding image selected and is based on data that is updated upon use of a content corresponding to the content-corresponding image.

8 Claims, 9 Drawing Sheets

(56) References Cited

U.S. PATENT DOCUMENTS

| | | | |
|---|---|---|---|
| 7,869,733 B2 | 1/2011 | Sato | |
| 2002/0133551 A1* | 9/2002 | Ohba et al. | 709/205 |
| 2003/0110503 A1* | 6/2003 | Perkes | 725/86 |
| 2004/0250265 A1* | 12/2004 | Suzuki et al. | 719/321 |
| 2006/0280447 A1 | 12/2006 | Ozaki | |
| 2007/0094611 A1* | 4/2007 | Sasaki | 715/804 |
| 2008/0010119 A1* | 1/2008 | Oliveira et al. | 705/14 |
| 2008/0028043 A1* | 1/2008 | Garbow et al. | 709/219 |
| 2008/0120648 A1* | 5/2008 | Carlson et al. | 725/39 |
| 2008/0209474 A1* | 8/2008 | Pjanovic et al. | 725/46 |
| 2008/0253444 A1* | 10/2008 | Ho | 375/240.01 |
| 2008/0285957 A1* | 11/2008 | Yoshimura et al. | 386/124 |
| 2008/0292353 A1 | 11/2008 | Sato | |
| 2009/0025054 A1* | 1/2009 | Gibbs et al. | 725/127 |
| 2009/0049389 A1* | 2/2009 | Kuzmanovic | 715/745 |
| 2009/0144340 A1* | 6/2009 | Ferguson | G06Q 30/04 |
| 2009/0153466 A1* | 6/2009 | Tilley | 345/156 |
| 2009/0164287 A1* | 6/2009 | Kies et al. | 705/8 |
| 2010/0100909 A1* | 4/2010 | Arsenault et al. | 725/70 |
| 2010/0121945 A1* | 5/2010 | Gerber et al. | 709/223 |
| 2010/0138865 A1* | 6/2010 | Rai et al. | 725/44 |
| 2010/0199179 A1* | 8/2010 | Suzuki et al. | 715/702 |
| 2010/0268789 A1* | 10/2010 | Yoo et al. | 709/214 |
| 2011/0010453 A1* | 1/2011 | Roy | 709/225 |
| 2011/0296468 A1* | 12/2011 | Pettit et al. | 725/62 |
| 2015/0220250 A1 | 8/2015 | Nakada | |

FOREIGN PATENT DOCUMENTS

| | | | |
|---|---|---|---|
| JP | 1994180630 A | 6/1994 | |
| JP | 0876953 A | 3/1996 | |
| JP | 2004030145 A | 1/2004 | |
| JP | 2005174211 A | 6/2005 | |
| JP | 2006343958 A | 12/2006 | |
| JP | 2008158194 A | 7/2008 | |
| JP | 2008186168 A | 8/2008 | |
| JP | 200959025 A | 3/2009 | |
| JP | 2009181464 A | 8/2009 | |
| JP | 2009303143 A | 12/2009 | |

OTHER PUBLICATIONS

Philips, Philips Net TV, May 25, 2009, http://www.youtube.com/watch?v=9vVzePjkiRc, All.*

International Preliminary Report on Patentability and Written Opinion for corresponding PCT application PCT/JP2010/056910, dated Mar. 22, 2012.

Office Action for corresponding Chinese Patent Application No. 201080036856.4, dated May 27, 2013.

Office Action for corresponding Japanese Patent Application No. 2011-527598, dated Jun. 4, 2013.

Office Action for corresponding Korean Patent Application No. 10-2012-7006792, dated Jun. 7, 2013.

International Search Report for corresponding JP application PCT/JP2012/056910, dated Aug. 31, 2010.

Office Action for corresponding JP Application No. 2014-029378, dated Feb. 17, 2015.

Office Action for corresponding JP Application No. 2014-029378, dated Aug. 4, 2015, 15 pages.

* cited by examiner

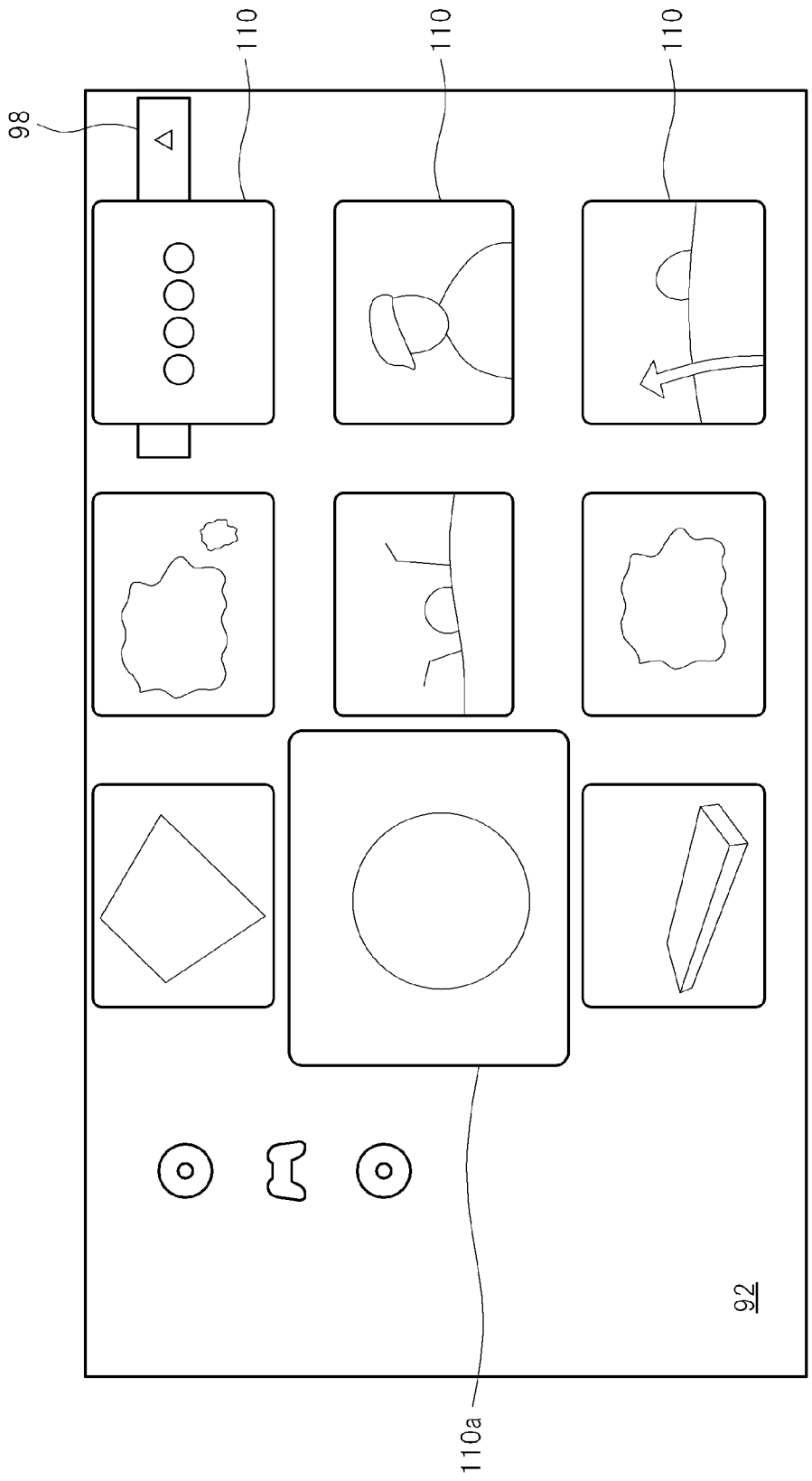

INFORMATION PROCESSING DEVICE, INFORMATION PROCESSING METHOD, INFORMATION STORAGE MEDIUM AND PROGRAM

TECHNICAL FIELD

The present invention relates to an information processing device, an information processing method, an information storage medium, and a program.

BACKGROUND ART

Information processing devices capable of providing a user with information have been available. Patent Literature 1 discloses an information providing device capable of producing a program by editing information on websites on a network so as to attract a user s interest and enabling automatically reproducing such information on websites on a user terminal.

CITATION LIST

Patent Literature

Patent Literature 1: U.S. Patent Application Publication 2002/0133551, specification

SUMMARY OF INVENTION

Technical Problem

For example, in promotion of a new product (e.g., a new game) or an event to be planned with respect to game users, it is expected that provision of information and execution of information processing according to a user s situation, such as which game the user has purchased thus far, which game the user has recently played, which movie or music content the user has enjoyed, and so forth, using a game device used by the user for playing may lead to increase of the user s appetite for purchase and participation in events. This is true not only with game users but also with users in general of information processing devices, such as a personal computer.

The present invention has been conceived in view of the above, and an object thereof is to provide an information processing device, an information processing method, an information storage medium, and a program capable of providing information and executing a processing according to a situation in which content is used.

Solution to Problem

In order to achieve the above described object, an information processing device according to the present invention comprises an obtaining unit for obtaining content-corresponding images corresponding to a plurality of respective contents; a screen image output unit for outputting a screen image showing a picture in which the respective content-corresponding images are placed according to a rule determined based on data that is updated upon use of the respective contents; and a processing executing unit for executing, upon receipt of selection of the content-corresponding image, a processing that corresponds to a content-corresponding image selected and is based on data that is updated upon use of a content corresponding to the content-corresponding image.

An information processing method according to the present invention comprises an obtaining step of obtaining content-corresponding images corresponding to a plurality of respective contents; a screen image output step of outputting a screen image showing a picture in which the respective content-corresponding images are placed according to a rule determined based on data that is updated upon use of the respective contents; and a processing executing step of executing, upon receipt of selection of the content-corresponding image, a processing that corresponds to a content-corresponding image selected and is based on data that is updated upon use of a content corresponding to the content-corresponding image.

An information storage medium according to the present invention is a computer readable information storage medium storing a program for causing a computer to function as an obtaining unit for obtaining content-corresponding images corresponding to a plurality of respective contents; a screen image output unit for outputting a screen image showing a picture in which the respective content-corresponding images are placed according to a rule determined based on data that is updated upon use of the respective contents; and a processing executing unit for executing, upon receipt of selection of the content-corresponding image, a processing that corresponds to a content-corresponding image selected and is based on data that is updated upon use of a content corresponding to the content-corresponding image.

A program according to the present invention is a program for causing a computer to function as an obtaining unit for obtaining content-corresponding images corresponding to a plurality of respective contents; a screen image output unit for outputting a screen image showing a picture in which the respective content-corresponding images are placed according to a rule determined based on data that is updated upon use of the respective contents; and a processing executing unit for executing, upon receipt of selection of the content-corresponding image, a processing that corresponds to a content-corresponding image selected and is based on data that is updated upon use of a content corresponding to the content-corresponding image.

According to the present invention, as a content-corresponding image is placed according to a rule based on data that is updated upon use of content, and a processing based on the data that is updated upon use of content is executed, a situation in which content is used has a corresponding relationship to placement of a content-corresponding image and a processing to be executed. Therefore, according to the present invention, it is possible to providing information and executing a processing according to a situation in which content is used.

According to one aspect of the present invention, the screen image output unit may output a screen image showing a picture in which the plurality of content-corresponding images are placed in an order determined based on history of using the contents. With the above, it is possible to provide information according to history of using content.

According to one aspect of the present invention, under the condition that a content corresponding to the content-corresponding image is available for use, the screen image output unit may output the content-corresponding image so as to be correlated to information to an effect that the content is available for use, and under the condition that the content-corresponding image that is output so as to be correlated to the information to the effect that the content is available for use is selected and a request for using the content corresponding to the content-corresponding image is received, the processing executing unit may execute a processing necessary for a user to use the content. With the above, content corresponding to a content-corresponding image can be used through a user s operation of selecting the content-corresponding image.

In this aspect, the content may be a content of a program, under the condition that a program corresponding to the content-corresponding image is executable, the screen image output unit may output the content-corresponding image so as to be correlated to information to an effect that the program corresponding to the content-corresponding image is executable, and under the condition that the content-corresponding image that is output so as to be correlated to the information to the effect that the program corresponding to the content-corresponding image is executable is selected and a request for executing the program corresponding to the content-corresponding image is received, the processing executing unit may execute a processing of executing the program.

According to one aspect of the present invention, the content-corresponding image may be correlated to location data indicating a plurality of locations where obtain-target data to be obtained are located, and the processing executing unit may obtain obtain-target data at a location specified based on data that is updated according to a situation in which a content corresponding to the content-corresponding image selected is used, among the plurality of locations indicated by the location data. With the above, it is possible to output obtain-target data according to a situation in which content is used.

BRIEF DESCRIPTION OF DRAWINGS

FIG. 9 is a diagram showing one example of the index screen image.

DESCRIPTION OF EMBODIMENTS

In the following, one embodiment of the present invention will be described in detail with reference to the accompanying drawings.

Figure 1:
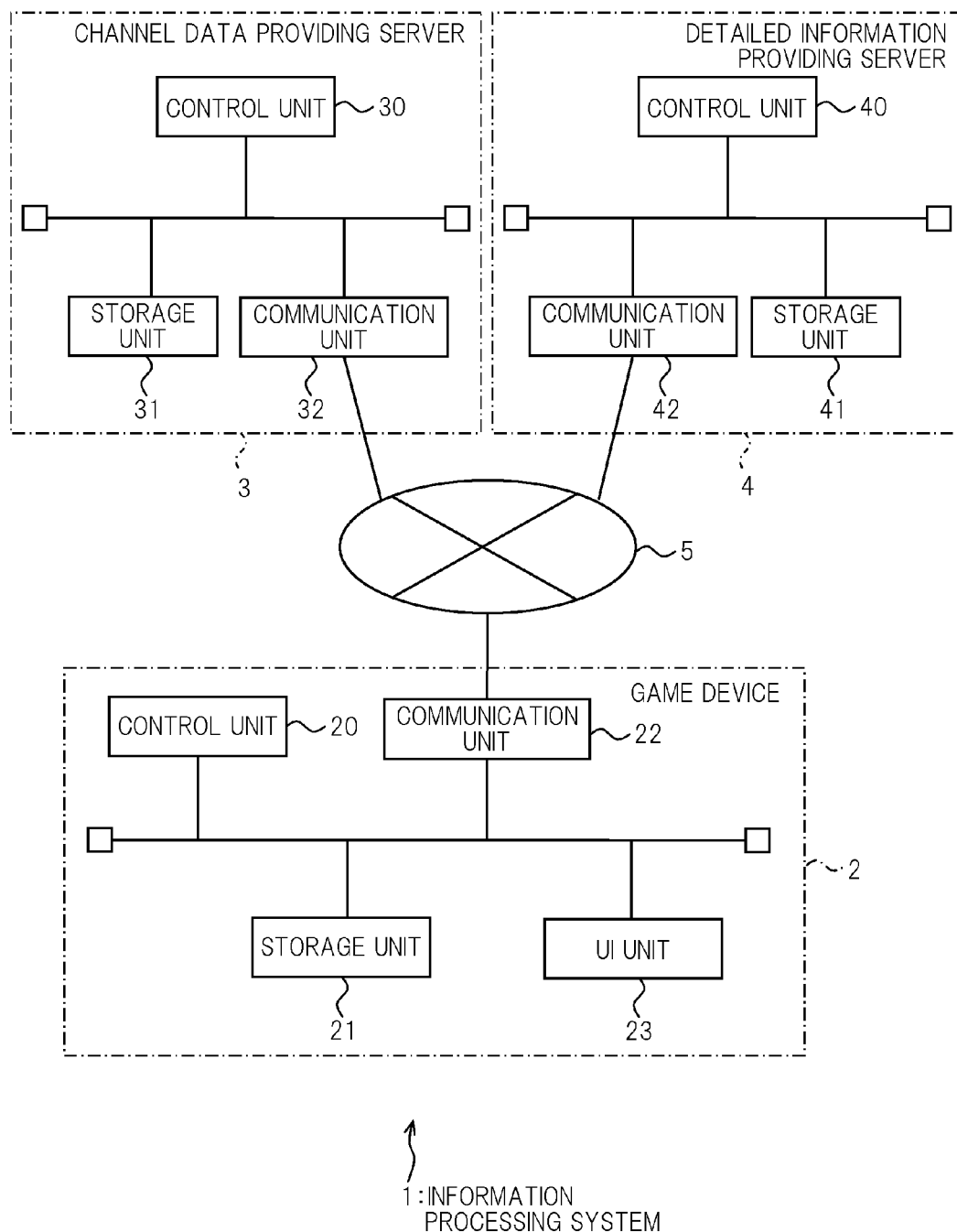
FIG. 1 is a diagram showing one example of a network structure of an information processing system according to this embodiment.

FIG. 1 is a diagram showing one example of a network structure of an information processing system 1 according to this embodiment. As shown in FIG. 1, the information processing system 1 comprises, e.g., an information processing device (e.g., a game device 2 in this embodiment), a channel data providing server 3, and a detailed information providing server 4. The game device 2, the channel data providing server 3, and the detailed information providing server 4 are connected to a network 5, such as the Internet.

The game device 2 comprises, e.g., a control unit 20, a storage unit 21, a communication unit 22, and a user interface (UI) unit 23. The channel data providing server 3 comprises, e.g., a control unit 30, a storage unit 31, and a communication unit 32. The detailed information providing server 4 comprises, e.g., a control unit 40, a storage unit 41, and a communication unit 42.

The control unit 20 of the game device 2, the control unit 30 of the channel data providing server 3, and the control unit 40 of the detailed information providing server 4 are each a program control device such as, e.g., a CPU. The storage unit 21 of the game device 2, the storage unit 31 of the channel data providing server 3, and the storage unit 41 of the detailed information providing server 4 are each a storage element, such as, e.g., a ROM or a RAM, or a hard disk drive. In the storage unit 21 of the game device 2, a program or the like to be executed by the control unit 20 of the game device 2 is stored. The storage unit 21 of the game device 2 operates also as a working memory of the control unit 20 of the game device 2. In the storage unit 31 of the channel data providing server 3, a program or the like to be executed by the control unit 30 of the channel data providing server 3 is stored. The storage unit 31 of the channel data providing server 3 operates also as a working memory of the control unit 30 of the channel data providing server 3. In the storage unit 41 of the detailed information providing server 4, a program or the like to be executed by the control unit 40 of the detailed information providing server 4 is stored. The storage unit 41 of the detailed information providing server 4 operates also as a working memory of the control unit 40 of the detailed information providing server 4.

The communication unit 22 of the game device 2, the communication unit 32 of the channel data providing server 3, and the communication unit 42 of the detailed information providing server 4 are each a communication interface, such as, e.g., a network board or a network card. The communication unit 22 of the game device 2, the communication unit 32 of the channel data providing server 3, and the communication unit 42 of the detailed information providing server 4 can send and receive data with respect to each other via the network 5. Note that the network 5 may be either wired or radio.

The UI unit 23 of the game device 2 is, e.g., a display, a speaker, a game pad, a mouse, a keyboard, and so forth, and outputs the content of an operation carried out by a user or sound input by a user to the control unit 20 of the game device 2. The UI unit 23 of the game device 2 outputs information by showing or outputting as sound according to an instruction input from the control unit 20 of the game device 2.

Figure 2:
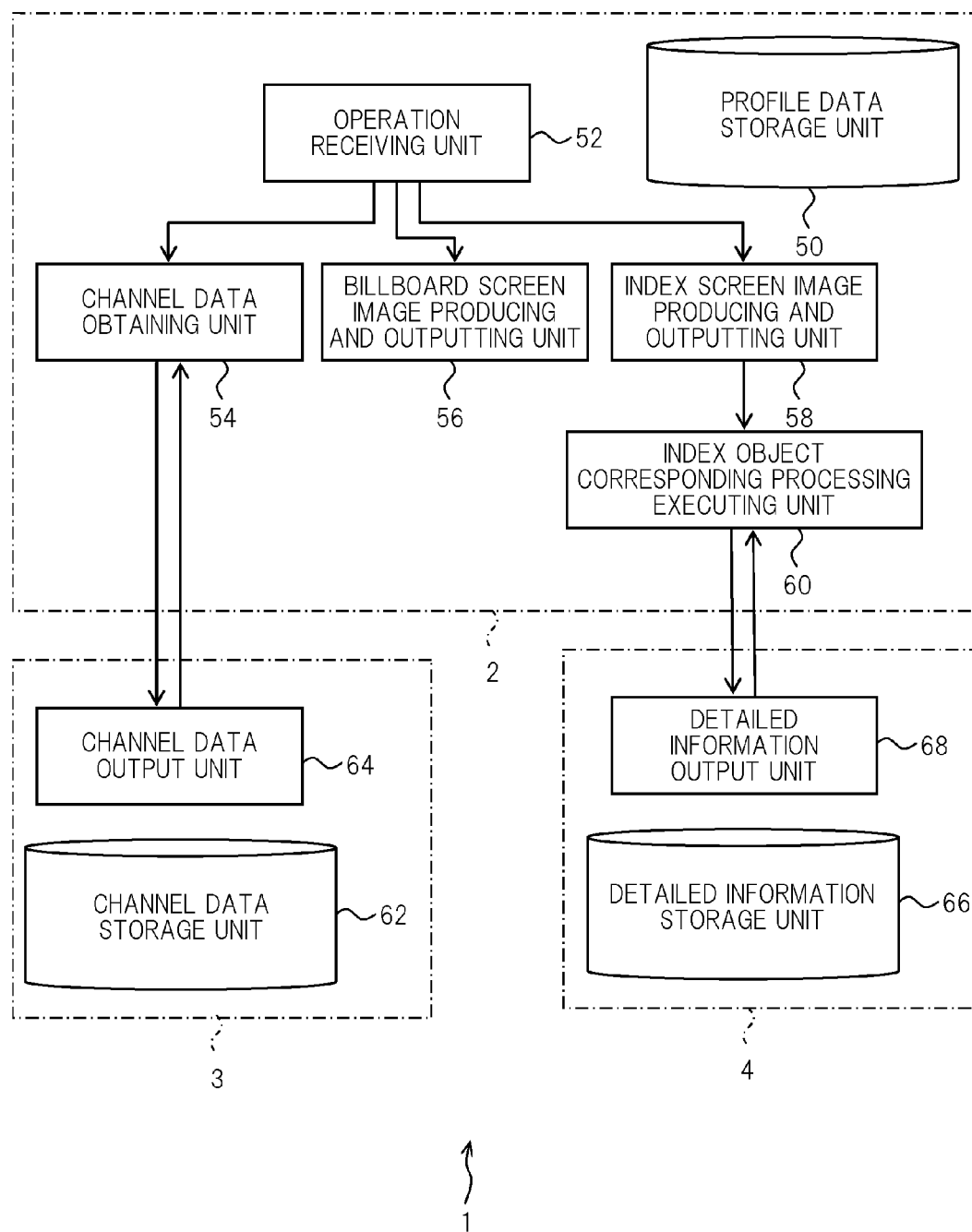
FIG. 2 is a functional block diagram showing one example of functions realized in the information processing system according to this embodiment.

FIG. 2 is a functional block diagram showing one example of main functions realized in the information processing system 1 according to this embodiment. As shown in FIG. 2, the game device 2 according to this embodiment comprises a profile data storage unit 50, an operation receiving unit 52, a channel data obtaining unit 54, a billboard screen image producing and outputting unit 56, an index screen image producing and outputting unit 58, and an index object corresponding processing executing unit 60. The profile data storage unit 50 is realized mainly by the storage unit 21 of the game device 2, while the other elements are realized mainly by the control unit 20 of the game device 2.

The channel data providing server 3 according to this embodiment comprises a channel data storage unit 62 and a channel data output unit 64. The channel data storage unit 62 is realized mainly by the storage unit 31 of the channel data providing server 3. The channel data output unit 64 is realized mainly by the control unit 30 of the channel data providing server 3.

The detailed information providing server 4 according to this embodiment comprises a detailed information storage unit 66 and a detailed information output unit 68. The detailed information storage unit 66 is realized mainly by the storage unit 41 of the detailed information providing server 4. The detailed information output unit 68 is realized mainly by the control unit 40 of the detailed information providing server 4.

These elements are realized by executing a program installed in the game device 2, which is a computer, the channel data providing server 3, which is a computer, or the detailed information providing server 4, which is a computer, by the control unit 20 of the game device 2, the control unit 30 of the channel data providing server 3, or the control unit 40 of the detailed information providing server 4, respectively. The program is supplied to the game device 2, the channel data providing server 3, and the detailed information providing server 4, respectively, via a computer readable information transmission medium, such as, e.g., a CD-ROM or a DVD-ROM, or via a communication network, such as the Internet.

Figure 3:
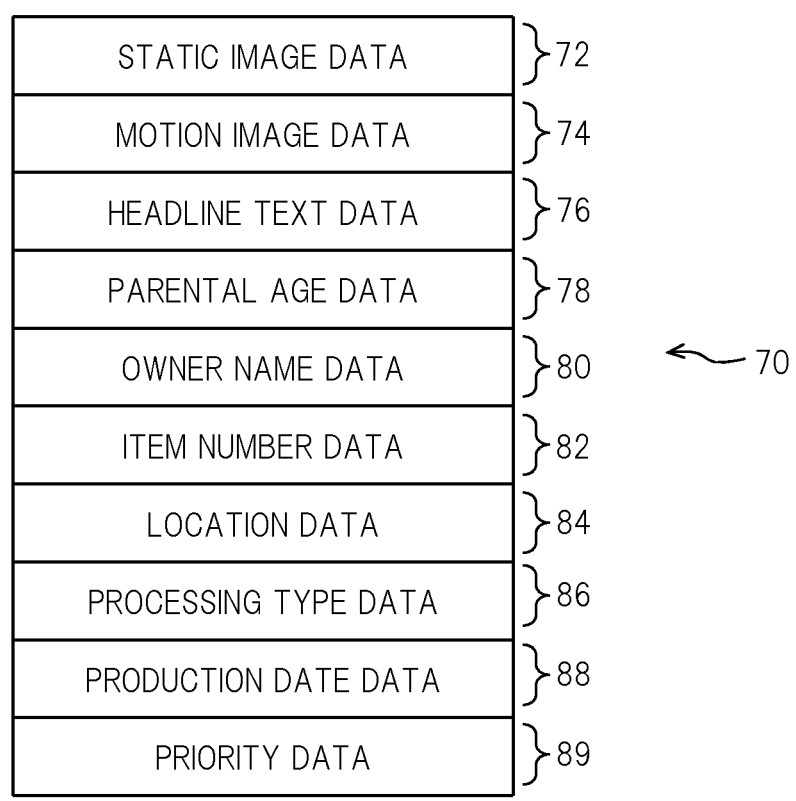
FIG. 3 is a diagram showing one example of a data structure of channel data.

In this embodiment, a plurality of channel data 70, shown in FIG. 3, are stored in advance in the channel data storage unit 62. The channel data 70 is, e.g., data on product information, event information, and so forth, to be provided to a user of the game device 2. The channel data 70 comprises, e.g., static image data 72 containing at least one static image (static image content), motion image data 74 containing at least one motion image (motion image content) (e.g., Flash (registered trademark) movie data, MPEG movie data, and so forth), headline text data 76, or character string data, parental age data 78, or data for control according to a user s age, owner name data 80 describing the name of a data provider, i.e., a company name, that provides data to a user, item number data 82 indicating the item number of at least one game program corresponding to the channel data 70, location data 84, or data indicating a location where data on detailed information on the channel data 70 is located (e.g., URI or a path), processing type data 86, production date data 88 indicating the production date of the channel data 70, and priority data 89. The item number data 82 correlates the channel data 70 and a game program. The item number data 82 may indicate the respective item numbers of a plurality of game programs. In this case, one channel data 70 is correlated to a plurality of game programs (e.g., a plurality of game programs that constitute a series). Note that details on the processing type data 86 and the priority data 89 will be described later.

In this embodiment, data on various profiles of the game device 2 is stored in advance in the profile data storage unit 50. Specifically, in the profile data storage unit 50, e.g., installed program item number data indicating the item number of at least one program (e.g., a game program) installed in the game device 2, execution history data relating to history of program execution by a user (e.g., history of game programs played by a user), personal information data concerning age, gender, hometown of a user of the game device 2, and so forth, are stored. The execution history data contains at least one individual execution history data that correlates a program item number and an execution date when the program is executed. In this embodiment, the above described program installed in the game device 2 is installed also in the storage unit 21 of the game device 2. Further, the parental age data 78, or data for use in controlling execution of the concerned program, is stored in the storage unit 21 of the game device 2 so as to be correlated to that program.

In the detailed information storage unit 66, detailed information (e.g., a motion image lasting for about 30 seconds for promotion, a Web page showing detailed information (detailed Web page), a game program for demonstration, and so forth) describing detailed information corresponding to the channel data 70 is stored. The detailed information output unit 68 executes a processing for outputting the detailed information to the game device 2.

In this embodiment, when a user starts up the game device 2, the operation receiving unit 52 of the game device 2 receives the start-up operation on the game device 2. Then, the channel data obtaining unit 54 of the game device 2 sends a request for outputting the channel data 70 to the channel data providing server 3. Upon receipt of the output request by the channel data providing server 3, the channel data output unit 64 of the channel data providing server 3 outputs the plurality of channel data 70 stored in the channel data storage unit 62 to the game device 2. Then, the channel data obtaining unit 54 of the game device 2 receives these channel data 70.

Figure 4:
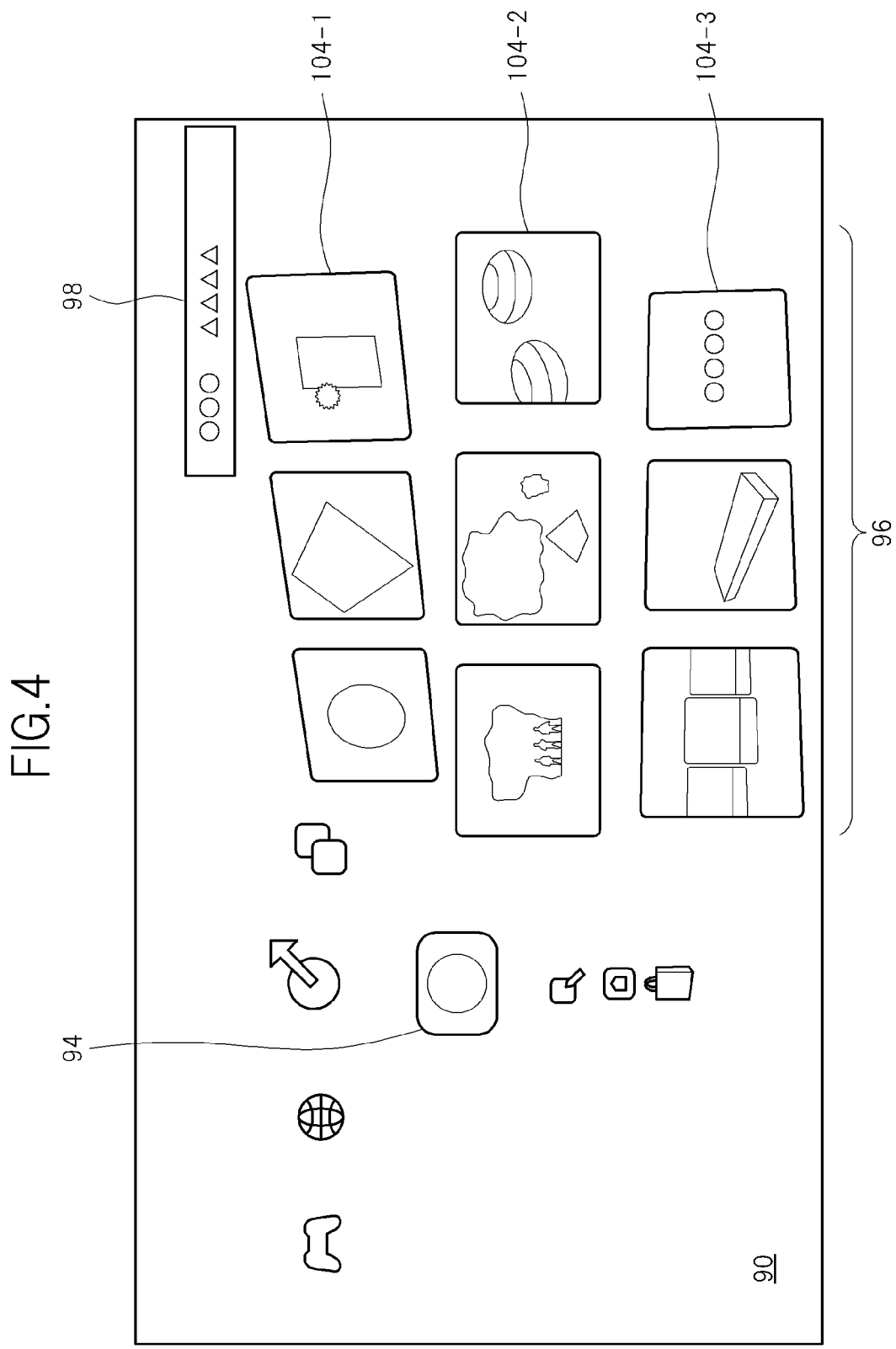
FIG. 4 is a diagram showing one example of a billboard screen image.

The billboard screen image producing and outputting unit 56 shows the billboard screen image 90 shown in FIG. 4 on the UI unit 23, such as a display. Then, when a user carries out a screen image switching operation (e.g., by pressing a predetermined button), the operation receiving unit 52 receives the screen image switching operation, and the index screen image producing and outputting unit 58 shows the index screen image 92 shown in FIG. 5 on the UI unit 23, such as a display.

The billboard screen image 90 comprises a channel indicating icon 94, a billboard showing area 96, and a headline bar 98, as shown in FIG. 4. The billboard screen image producing and outputting unit 56 sequentially shows character strings described by the headline text data 76 contained in the channel data 70 obtained by the channel data obtaining unit 54, in a predetermined order (e.g., in a random order) in the headline bar 98, while scrolling the character strings from right to left.

Figure 6:
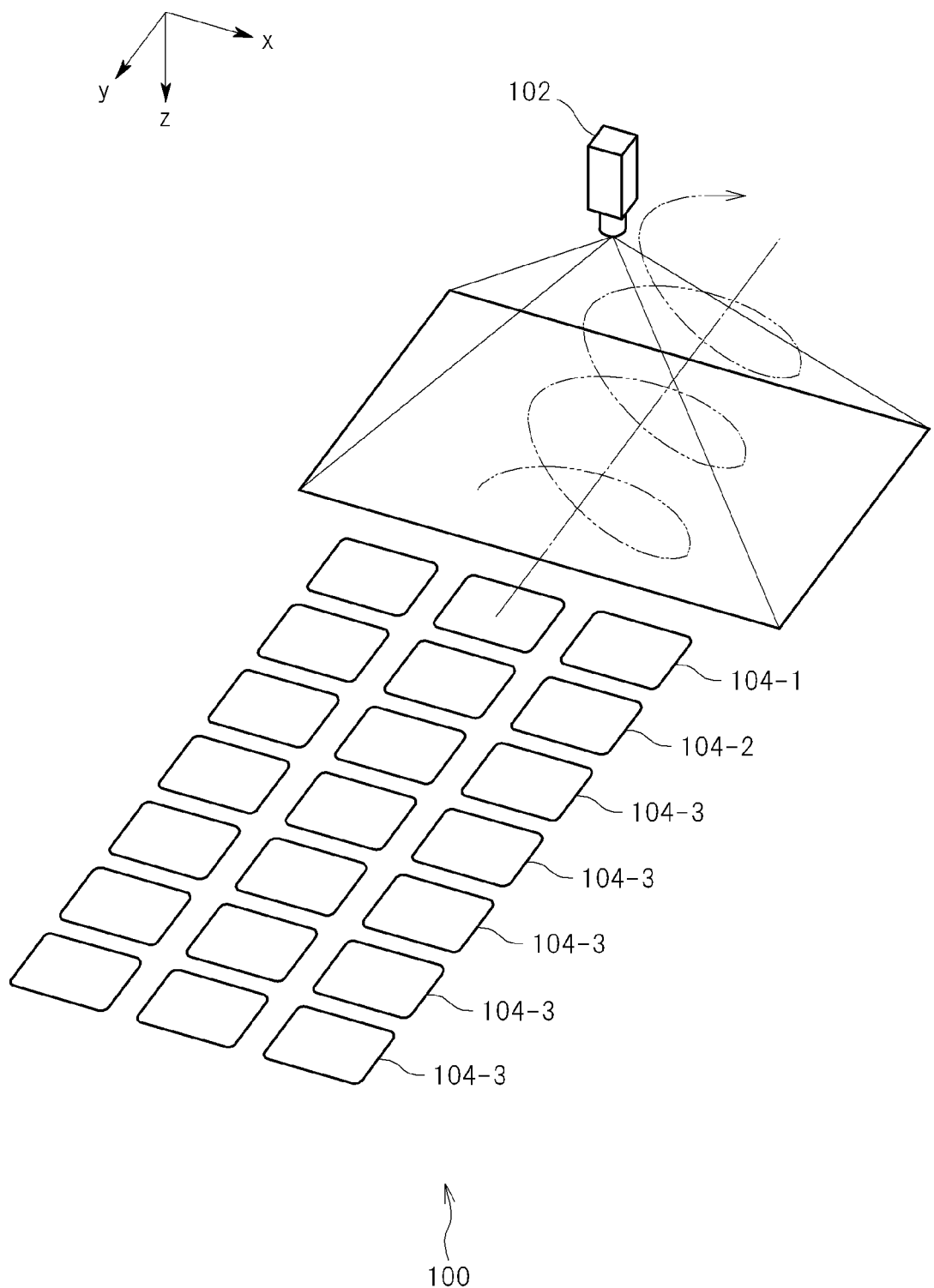
FIG. 6 is a perspective view showing one example of a whole image of a billboard space.

Further, the billboard screen image producing and outputting unit 56 shows an image that visualizes the virtual 3D space (billboard space 100) shown in FIG. 6 in the billboard showing area 96. Specifically, for example, a picture obtained by viewing the billboard space 100 from a viewpoint 102 in the billboard space 100 is visualized on a real time basis using a publicly known 3D computer graphics technique to thereby produce an image to be shown in the billboard showing area 96, in which a billboard object 104 is placed in the billboard space 100, and the billboard object 104 is a panel-like 3D model where a static image included in each channel data 70 obtained by the channel data obtaining unit 54 is mapped as a texture. Each billboard object 104 is formed using a polygon.

FIG. 6 is a perspective view showing one example of the whole image of the billboard space 100. As shown in FIG. 6, in the billboard space 100, billboard objects 104 corresponding to the respective channel data 70 are arranged in a matrix. In the example shown in FIG. 6, three billboard objects 104 are aligned in a single lateral line, or a row, in the billboard space 100. In this embodiment, the billboard screen image producing and outputting unit 56 determines a position (order) to place a billboard object 104 corresponding to each channel data 70 obtained by the channel data obtaining unit 54, based on priority data 89 contained in the channel data 70 or data stored in the profile data storage unit 50. Then, the billboard screen image producing and outputting unit 56 places the respective billboard objects 104 in the determined order.

Note that the billboard screen image producing and outputting unit 56 may place near each billboard object 104, a character string indicating a date indicated by the production date data 88 contained in the channel data 70 corresponding to that billboard object 104.

Note that in FIG. 6, the lateral rightward direction in which the billboard objects 104 are arranged is defined as the x-axial direction, the longitudinal downward direction in which the billboard objects 104 are arranged is defined as the y-axial direction, and the vertical downward direction relative to the billboard objects 104 (the viewing direction) is defined as the z-axial direction.

The billboard screen image producing and outputting unit 56 moves all of the billboard objects 104 aligned in a single row (three billboard objects 104 in the example shown in FIG. 6) upward (in the negative direction of the y-axis) relative to the viewpoint 102 at a predetermined speed, while rotating counterclockwise relative to the positive direction of the y-axis (clockwise relative to the negative direction of the y axis), with the y-axis used as a rotation axis. Obviously, the billboard screen image producing and outputting unit 56 may move the position of the viewpoint 102 in the positive direction of the y axis. In this manner, a picture showing three billboard objects 104 arranged in a single row rotating clockwise as a whole, using the upward direction of the billboard screen image 90 as the rotation axis (that is, a picture showing the billboard objects 104 being scrolled) is shown in the billboard showing area 96. Note that the position of the viewpoint 102 may be determined in the initial state such that the billboard objects 104 in the uppermost single row are positioned in the middle of the billboard screen image 90.

When the billboard objects 104 arranged in the lowermost single row in the billboard space 100 are finished being shown in the billboard screen image 90, the billboard screen image producing and outputting unit 56 again sequentially shows the billboard objects 104 in the same manner, beginning with the billboard objects 104 arranged in the uppermost single row.

Below, one example of a flow of a processing to be executed in the game device 2 according to this embodiment from determination of a position to place the billboard object 104 to placement of each billboard object 104 will be described referring to the flowchart shown in FIG. 7. Note that, in this embodiment, each priority data 89 includes a priority flag and priority order data, the priority flag indicating whether or not the concerned data needs to be shown with priority (e.g., whether or not the concerned data is channel data 70 to be attended to by a user), and the priority order data indicating a priority order in showing.

Initially, based on at least one of the personal information data stored in the profile data storage unit 50 and a result of comparison between the age of a user specified based on the setting on the network service and the age indicated by the parental age data 78 contained in the channel data 70, the billboard screen image producing and outputting unit 56 specifies channel data 70 that is permitted to be shown to a user of the game device 2, as display permitted channel data (S101). Then, from among the display permitted channel data, the billboard screen image producing and outputting unit 56 specifies up to three display permitted channel data each containing a priority flag instructing to show the concerned data with priority, as first group display permitted channel, beginning with the one with the highest priority order indicated by the contained priority order data (S102). Then, the billboard screen image producing and outputting unit 56 places the billboard objects 104 (first group billboard objects 104-1) corresponding to the respective first group display permitted channel data from left to right in the highest lateral line (the first row) in the billboard space 100 according to the respective display orders (S103).

Then, based on the execution history data stored in the profile data storage unit 50, the billboard screen image producing and outputting unit 56 specifies up to three programs recently executed by a user (e.g., a game program recently played by a user) (S104). Thereafter, based on the item number data 82 contained in the respective display permitted channel data other than the first group display permitted channel data, the billboard screen image producing and outputting unit 56 specifies the display permitted channel data corresponding to the respective programs recently executed by a user and specified in the processing at S104, as second group display permitted channel data (S105). Then, the billboard screen image producing and outputting unit 56 places the respective billboard objects 104 (the second group billboard objects 104-2) corresponding to the respective second group display permitted channel data sequentially from left to right in the second lateral line (second row) from the top in the billboard space 100, beginning with the one with the corresponding program most recently executed (S106).

Thereafter, the billboard screen image producing and outputting unit 56 places the billboard objects 104 (the third group billboard object 104-3) corresponding to the remaining respective display permitted channel data (the third group display permitted channel data) in the third and thereafter rows in a predetermined order (e.g., beginning with the one corresponding to the display permitted channel data with the highest priority order indicated by the contained priority order data, or the one corresponding to the display permitted channel data with the latest date indicated by the contained production date data 88) (S107) before ending the processing.

Note that under the condition that no display permitted channel data is found in the processing at S105 that corresponds to a program recently executed by a user and specified in the processing at S104, the billboard screen image producing and outputting unit 56, as to that program, places a billboard object 104 having a thumbnail image of the program mapped thereon as a texture, the thumbnail image being stored in the storage unit 21 of the game device 2.

As described above, in this embodiment, as display permitted channel data is specified based on a result of comparison between the parental age data 78 and the personal information data, and images corresponding to these display permitted channel data are shown in the billboard screen image 90, it is possible to show information according to a user s age in the billboard screen image 90. Further, as the channel data 70 containing a priority flag is placed in the first row in the billboard space 100, it is possible to have a user to attend to the images corresponding to these channel data 70. Still further, as the channel data 70 corresponding to a program recently executed by a user and specified based on the execution history data is placed in the second row in the billboard space 100, it is possible to have a user to attend to the images corresponding to these channel data 70.

Figure 5:
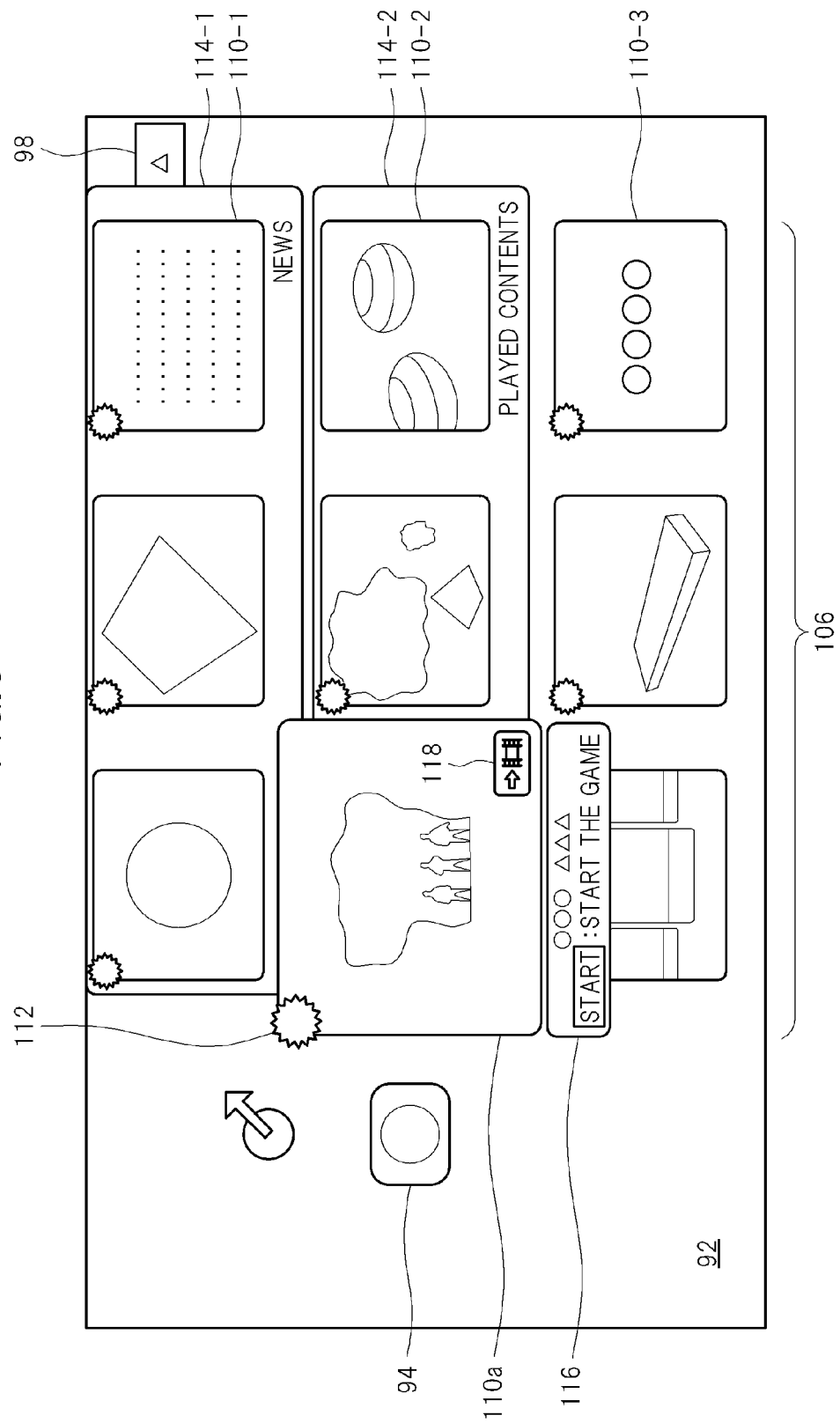
FIG. 5 is a diagram showing one example of an index screen image.

As shown in FIG. 5, the index screen image 92 includes the channel indicating ion 94, the index showing area 106, and the headline bar 98. The index screen image producing and outputting unit 58 sequentially shows the character strings described by the headline text data 76 contained in the respective channel data 70 obtained by the channel data obtaining unit 54, in the headline bar 98 in a predetermined order (e.g., in a random order), while scrolling the character strings from right to left.

Figure 8:
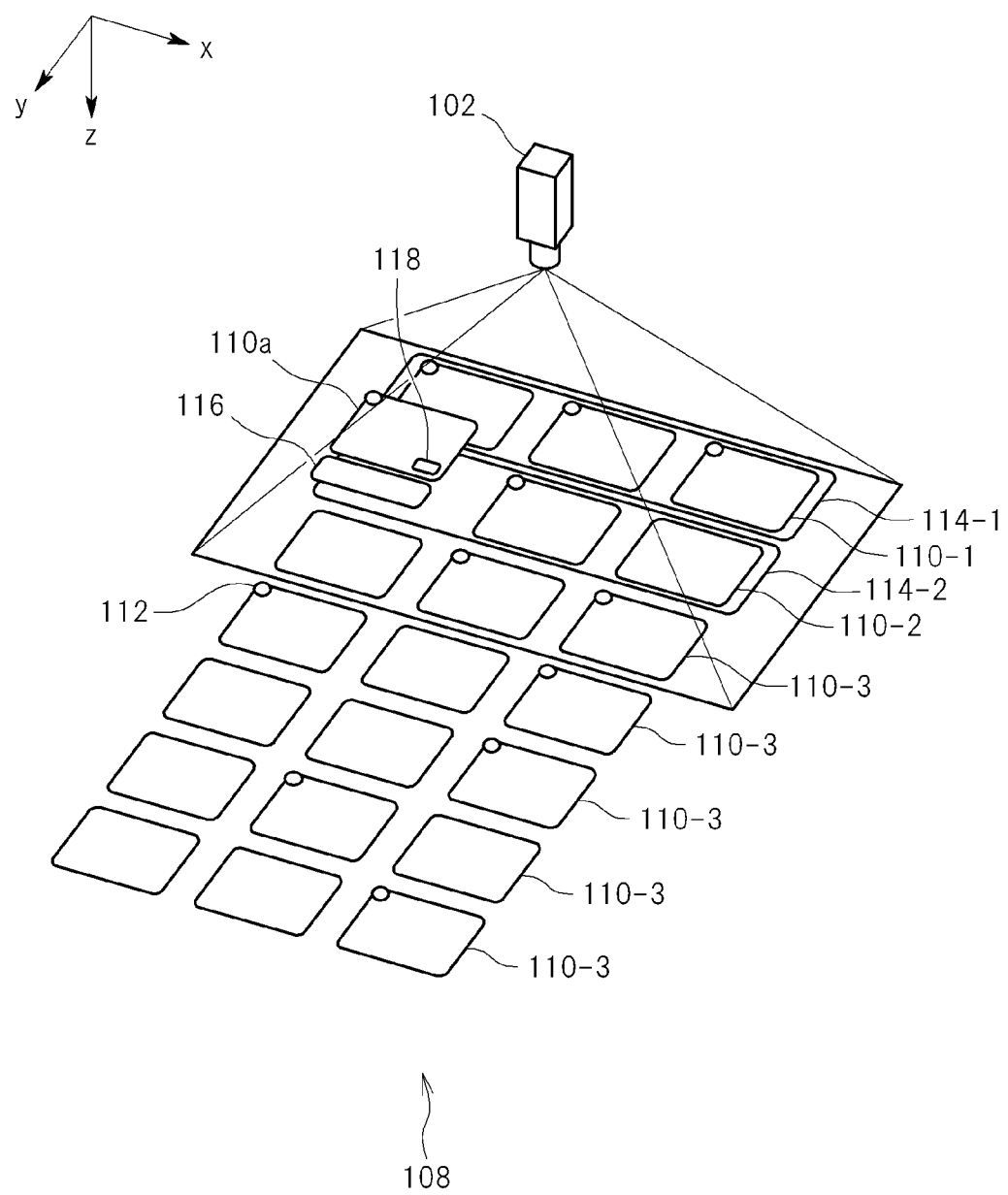
FIG. 8 is a perspective view showing one example of a whole image of an index space.

Further, the index screen image producing and outputting unit 58 shows an image that visualizes the virtual 3D space (index space 108) shown in FIG. 8 in the index showing area 106. Specifically, e.g., as to each channel data 70 obtained by the channel data obtaining unit 54, a picture obtained by viewing the index space 108 from the viewpoint 102 in the index space 108 is put into an image on a real time basis using a known 3D computer graphics technique to thereby produce an image to be shown in the index showing area 106, in which an index object 110 is placed in the index space 108, and the index object 110 is a panel-like 3D model where a motion picture contained in motion image data 74 is mapped as a texture when the channel data 70 obtained by the channel obtaining unit 54 contains the motion image data 74, and a static image contained in static image data 72 is mapped as a texture when the channel data 70 contains no motion image data 74. Each index object 110 is formed using a polygon. In the index screen image 92, the motion image mapped on the index object 110 is reproduced.

FIG. 8 is a perspective view showing one example of the whole image of the index space 108. As shown in FIG. 8, the index objects 110 corresponding to the motion image data 74 or the static image data 72 are placed in a matrix in the index space 108. The position (order) where each index object 110 is placed corresponds to the position (order) where the billboard object 104 is placed. Further, a characteristic showing object 112 may be placed at the upper left corner of each index object 110, the characteristic showing object 112 being a disk-like 3D model where an image showing characteristic of the channel data 70 corresponding to that index object 110 is mapped as a texture. Specifically, e.g., a disk image with the character string New written thereon is shown at the upper left corner of channel data 70 that is produced within late two weeks. Note that the respective directions of the x, y, and z axes in FIG. 8 are the same as those in FIG. 6.

In the index space 108, a first group-correlated object 114-1, which is a panel-like 3D model, is placed under (in the positive z axial direction) all of the index objects 110 corresponding to the first group display permitted channel data (the first group index objects 110-1). Similarly, a second group-correlated object 114-2, which is a panel-like 3D model, is placed under (in the positive z axial direction) all of the index objects 110 corresponding to the second group display permitted channel data (the second group index objects 110-2). However, no group-correlated object 114 is placed under any of the index objects 110 corresponding to the third group display permitted channel data (the third group index objects 110-3). With the above, a user can readily recognize by viewing the index objects 110 corresponding to the first or second group display permitted channel data.

When the operation receiving unit 52 receives a screen image switching operation, the index screen image producing and outputting unit 58 specifies the billboard object 104 shown in a position closest to the channel indicating ion 94 in the billboard screen image 90, then moves the index object 110 corresponding to the specified billboard object 104 (hereinafter referred to as a selected index object 110a) in the opposite direction of the z axis while not moving the other index objects 110, as shown in FIG. 8, and places the headline object 116, which is a panel-like 3D model, below (in the positive y axial direction) the selected index object 110a. In the example shown in FIG. 8, the index object 110 at the left end in the second row is the selected index object 110a. The index screen image producing and outputting unit 58 places a character string corresponding to the headline text data 76 contained in the channel data 70 corresponding to the selected index object 110a (hereinafter referred to as selected channel data) on the surface of the headline object 116. Thereafter, the index screen image producing and outputting unit 58 compares the item number data 82 contained in the selected channel data and the installed program item number data stored in the profile data storage unit 50 to determine whether or not a program corresponding to the selected channel data is installed. Under the condition that such a program is installed, information telling that the program is executable (e.g., a character string "START: start the game") is additionally shown on the surface of the headline object 116. As described above, in this embodiment, under the condition that a program is installed, the operation goes on while regarding that the program is executable. In this manner, in this embodiment, a user can recognize by viewing the headline object 116 whether or not a program corresponding to the headline object 116 is executable.

Note that a method for determining whether or not a program is executable is not limited to the above-described method. The index screen image producing and outputting unit 58 may determine in advance whether or not a program is executable.

The index screen image producing and outputting unit 58 places at the lower right corner of the selected index object 110a, a processing type indicator image 118 that is determined based on the processing type data 86 contained in the channel data 70 corresponding to the selected index object 110a. The processing type indicator image 118 is an image indicating the type of a processing to be executed according to a processing executing operation (e.g., an operation of pressing a predetermined button) received from a user by the operation receiving unit 52. Specifically, the processing type data 86 corresponds to, e.g., "video reproduction", "display of detailed Web page", "execution of demonstration game program" and so forth. In this embodiment, the processing type indicator image 118 is an image corresponding to the processing type data 86. The above described state of the selected index object 110a is referred to as a selected state.

Thereafter, under the condition that the operation receiving unit 52 receives a processing executing operation from a user, the index object corresponding processing executing unit 60 executes a processing corresponding to the processing type data 86 contained in the channel data 70 corresponding to the selected index object 110a. For example, the index object corresponding processing executing unit 60 determines based on a result of comparison between the age indicated by the parental age data 78 corresponding to the selected index object 110a and the age indicated by the personal information data stored in the profile data storage unit 50, whether or not presentation of the concerned detailed Web page to the user is permitted. Under the condition that presentation of the detailed web page to a user is permitted, the index object corresponding processing executing unit 60 outputs a request for outputting the Web page correlated to the location data 84 contained in the selected channel data to the detailed information providing server 4. Thereupon, the detailed information output unit 68 included in the detailed information providing server 4 outputs the Web page corresponding to the location data 84, stored in the detailed information storage unit 66 to the game device 2. Having received the Web page, the index object corresponding processing executing unit 60 shows the Web page on the UI unit 23, such as a display, via a Web browser, or the like.

Under the condition that information to the effect that the program is executable is shown on the headline object 116 placed below (in the positive Y direction) the selected index object 110a, and the operation receiving unit 52 receives a program executing operation (e.g., an operation of pressing the START button), the index object corresponding processing executing unit 60 determines based on a result of comparison between the age indicated by the parental age data 78 of the program, stored in the storage unit 21 of the game device 2 so as to be correlated to the program corresponding to the selected index object 110a and the age indicated by the personal information data stored in the profile data storage unit 50, whether or not execution of the concerned program is permitted to the user. Under the condition that it is determined that program execution is permitted, the index object corresponding processing executing unit 60 executes a program corresponding to the channel data 70 corresponding to the selected index object 110a, installed in the game device 2. In this manner, in this embodiment, a user can start up a program via the index screen image 92. Further, the content shown in the headline object 116 can be changed depending on whether or not a corresponding program is installed in the game device 2.

Under the condition that the operation receiving unit 52 receives an operation for changing the selected index object 110a (e.g., an operation of pressing the up, down, left, right direction keys), the index screen image producing and outputting unit 58, in response to the operation, releases the selected index object 110a, which is in the selected state before the receipt of the operation, from the selected state, and puts the index object 110 newly selected (newly selected index object 110a) in the selected state. In this embodiment, under the condition that the newly selected index object 110a is positioned outside the view field range (outside the range of the index screen image 92) of the viewpoint 102, the index screen image producing and outputting unit 58 moves the position of the viewpoint 102 such that the newly selected index object 110a is included in the view field range of the viewpoint 102. That is, the index screen image 92 is scrolled.

Note that the present invention is not limited to the above-described embodiment. Below, a second embodiment will be described, mainly referring to the difference from the above-described embodiment.

In this embodiment, at least one movie content is stored in the storage unit 21 of the game device 2, and stored movie content item number data indicating the item number of at least one movie content stored in the storage unit 21 of the game device 2 and reproduction history data regarding history of reproduction of movie content by a user are stored in the profile data storage unit 50.

The item number data 82 contained in the channel data 70 indicates the item number of a movie content. The item number data 82 may indicate the respective item numbers of a plurality of movie contents that constitute a series.

The billboard screen image producing and outputting unit 56 specifies a movie content recently reproduced by a user, based on the reproduction history data, to thereby specify display permitted channel data corresponding to these movie contents as second group display permitted channel data.

The index screen image producing and outputting unit 58 compares the item number data 82 contained in the selected channel data and the stored movie content item number data contained in the profile data storage unit 50 to determine whether or not the movie content corresponding to the selected channel data is stored in the storage unit 21 of the game device 2. Under the condition that such a content is stored in the storage unit 21, information to the effect that the movie content is ready for reproduction (e.g., the character string "START: movie reproduction") is additionally shown on the surface of the headline object 116. Under the condition that information to the effect that a movie content is ready for reproduction is shown in the headline object 116 placed below (in the positive y direction) the selected index object 110a and the operation receiving unit 52 receives an operation for requesting reproduction of the movie content (e.g., an operation of pressing the START button), the index object corresponding processing executing unit 60 starts reproduction of the movie content corresponding to the channel data 70 corresponding to the selected index object 110a and stored in the storage unit 21 of the game device 2.

Note that the present invention is not limited also to the above-described embodiment.

For example, the location data 84 may indicate a plurality of different locations. The index object corresponding processing executing unit 60 may determine whether or not a program corresponding to the selected channel data is installed in the game device 2, then obtain a detailed Web page at the location corresponding to the result of determination from the detailed information providing server 4, and show the detailed Web page on the UI unit 23, such as a display. This makes it possible to show a different detailed Web page, depending on whether or not the program is installed in the game device 2.

Further, the channel data obtaining unit 54 may output the received channel data 70 to the storage unit 21 of the game device 2. Then, the channel data obtaining unit 54 may obtain the channel data 70 stored in the storage unit 21 under the condition that a predetermined period of time has not yet passed since the last start-up, and obtain the latest channel data 70 from the channel data providing server 3 under the condition that a predetermined period of time has been passed since the last start-up and output for update to the storage unit 21 of the game device 2.

Further, the channel data providing server 3 may be available for each country or region. The channel data obtaining unit 54 of the game device 2 may obtain channel data 70 corresponding to a concerned country or region from the channel data providing server 3 determined based on data indicating a country or a region, the data being stored in the profile data storage unit 50 of the game device 2. Further, the channel data 70 may be correlated to any of the plurality of languages. The billboard screen image producing and outputting unit 56 and the index screen image producing and outputting unit 58 may determine the channel data 70 to be shown, based on data indicating a language, the data being stored in the profile data storage unit 50 of the game device 2.

Further, the above-described processing type data 86 may correspond to a processing of "showing an on-line shopping screen image". In this case, the index object corresponding processing executing unit 60 may send a request for outputting a purchase screen image to an on-line shopping site, the request containing as a parameter the item number indicated by the item number data 82 contained in the selected channel data. Thereupon, the on-line shopping site may show a purchase screen image for a product corresponding to the selected channel data (e.g., a game program) on the UI unit 23, such as a display, of the game device 2.

Further, in the information processing system 1, based on the profile data correlated to a user (e.g., data on history of purchase of a game program), stored in the channel data providing server 3 or a server for providing network service such as on-line shopping, the billboard screen image producing and outputting unit 56 may execute a processing of determining placement of the billboard object 104, and the index object corresponding processing executing unit 60 may execute a processing according to the processing type data 86.

Further, the index screen image producing and outputting unit 58 may switch a motion image to be mapped as a texture onto the index object 110 between an index object 110 in the selected state and an index object 110 not in the selected state. Further, the index screen image producing and outputting unit 58 may switch a motion image to be mapped as a texture onto the index object 110 between an index object 110 with a corresponding program installed in the game device 2 and an index object 110 with a corresponding program not installed in the game device 2.

Figure 7:
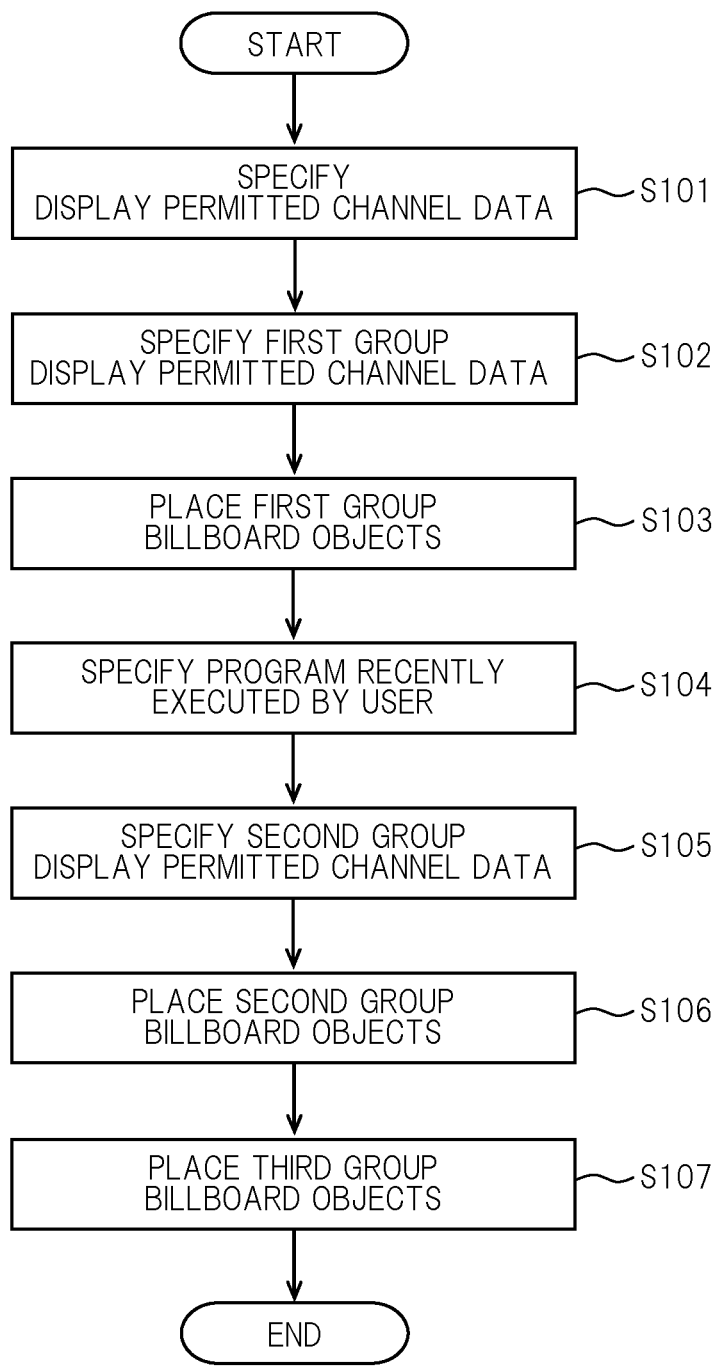
FIG. 7 is a flowchart showing one example of a flow of a processing executed in a game device according to this embodiment.

In the processing shown in FIG. 7, the billboard screen image producing and outputting unit 56 may specify one, two, four, or more channel data 70 as the first group display permitted channel data or the second group display permitted channel data.

The motion image data 74 of the channel data 70 may be stored in the detailed information providing server 4, and other data may be stored in the channel data providing server 3.

The channel data 70 may include a plurality of static image data 72, so that the billboard screen image producing and outputting unit 56 may map different static image data 72 as a texture onto the billboard object 104, depending on whether or not a program corresponding to the channel data 70 is installed in the game device 2.

A network service program available for a user of the game device 2 may be executed in the channel data providing server 3 so that only a user having an account of the network service program can receive the above-described channel data 70.

Under the condition that a DVD or Blu-ray (registered trademark) disk where a game program or a movie content corresponding to the channel data 70 is recorded may be placed on an optical disk drive of the game device 2 so that the game program and movie content can be read, the index screen image producing and outputting unit 58 may additionally show on the surface of the headline object 116 information to the effect that the content is available for use. In this case, under the condition that the operation receiving unit 52 receives an operation for requesting use of content (e.g., an operation of pressing the START button), the index object corresponding processing executing unit 60 reads the content from the optical disk drive, and starts executing an start-up processing for the game program or a reproduction processing for the movie content.

Under the condition that the operation receiving unit 52 receives an operation for requesting use of content (e.g., an operation of pressing the START button), the index object corresponding processing executing unit 60 may show in the index screen image 92, information for encouraging insertion of a disk where a content corresponding to the index object 110 requested to be used (e.g., a game program or movie content) is recorded.

The billboard screen image producing and outputting unit 56 may specify a content (movie content and/or a game program) recently reproduced or executed by a user regardless of the kind of content, and then specify display permitted channel data corresponding to the content as the second group display permitted channel data.

The channel data 70 may include characteristic amount data indicating the amount of characteristics that enable specification of a content (e.g., a content data size or the like), instead of the item number data 82. Then, the billboard screen image producing and outputting unit 56 may specify contents recently reproduced or executed by a user, based on the reproduction history data, and then specify display permitted channel data corresponding to the specified contents as the second group display permitted channel data, based on the characteristic amount of the specified contents and the characteristic amount data contained in each channel data 70.

The channel data 70 may be correlated to static image content such as photographic content or sound content such as music content (e.g., music content recorded on a CD).

The present invention is not limited also to the above described embodiment, and may be applied to a game device 2 that obtains data for use as a base of the billboard screen image 90 and/or the index screen image 92 not from the channel data providing server 3 or the detailed information providing server 4 via the network 5 but from an information recording medium read via the optical disk drive, as described in a third embodiment to be described later. Below, the third embodiment will be described mainly referring to the difference from the above-described respective embodiments.

In this embodiment, under the condition that a user places an information recording medium, such as a DVD or a Blu-ray (registered trademark) on the optical disk drive of the game device 2, the game device 2 reads the content recorded on the information recording medium. In this embodiment, data similar to the data stored in the channel data storage unit 62 of the channel data providing server 3 in the first embodiment is recorded in the information recording medium. Further, in this embodiment, a game program and at least one additional content are recorded in the information recording medium from which content is read. In this embodiment, the additional content may be either, e.g., wall paper, a program to be installed (e.g., a trial program), or motion image content, with each additional content being correlated to the processing type data 86 for identifying a content type.

When a user places the information recording medium on the optical disk drive and then selects a predetermined icon, the billboard screen image producing and outputting unit 56 shows the billboard screen image 90 on the UI unit 23, such as a display. Note that when a user carries out a screen image switching operation (e.g., pressing a predetermined button), the operation receiving unit 52 receives the screen image switching operation, and the index screen image producing and outputting unit 58 shows the index screen image 92 on the UI unit 23, such as a display. Similar to the first embodiment, the billboard screen image 90 is an image that visualizes the billboard space 100, and the index screen image 92 is an image that visualizes the index space 108. FIG. 9 shows one example of the index screen image 92 in this embodiment.

In this embodiment, a billboard object 104 corresponding to the additional content is placed in the billboard space 100 in the order indicated by the order defining data recorded in the information recording medium. Further, an index object 110 corresponding to the additional content is placed in the index space 108 in the order indicated by the order defining data recorded in the information recording medium.

In this embodiment, the billboard object 104 in the billboard space 100 and the index object 110 in the index space 108 behave similarly to those in the first embodiment.

In this embodiment as well, the index object corresponding processing executing unit 60 executes a processing corresponding to the selected index object 110*a* according to a processing executing operation received from a user. In this embodiment, e.g., under the condition that the selected index object 110*a* corresponds to wall paper, the index object corresponding processing executing unit 60 executes an installation processing and an application processing for the wall paper. Note that in this embodiment, the index object corresponding processing executing unit 60 executes the processing from installation to application of wall paper as a series of processing without intervention by a user. Meanwhile, under the condition that the selected index object 110*a* corresponds to a program to be installed, the index object corresponding processing executing unit 60 executes installation and start-up processing for the program corresponding to the index object 110. Note that in this embodiment, the index object corresponding processing executing unit 60 executes the processing from installation to start-up of a program as a series of processing without intervention by a user. Further, under the condition that the selected index object 110*a* corresponds to motion image content, the index object corresponding processing executing unit 60 executes a reproduction processing for the motion image content.

As described above, a game device 2 according to the third embodiment executes a processing according to the type of additional content, such as, e.g., installation and start-up of a program, reproduction of a motion image content, and installation and application of wall paper, according to a processing executing operation received from a user. Further, in this embodiment, motion image content, instead of a game program, may be recorded in an information recording medium.

The invention claimed is:

1. An information processing device, comprising:
    an obtaining unit configured to obtain channel data, the channel data including: (i) a plurality of content-corresponding images, each of the content-corresponding images corresponding to one of a plurality of respective content items, and (ii) location data indicating a plurality of locations on a packet switched network where respective obtain-target data for each of the respective content items are located, where the respective content-corresponding images are correlated to certain of the location data, where the obtain-target data for at least one of the content items includes a respective, and different, obtain target data located at each of a number of different locations among the plurality of locations, and where the channel data are updated based whether one or more of the respective content items are selected by a user of the information processing device;
    a screen image output unit configured to output a screen image showing a picture in which a plurality of the respective content-corresponding images are simultaneously placed; and
    a processing executing unit configured to execute a processing that corresponds to a user-selected one of the content-corresponding images and is based on the channel data, such that the processing varies based on whether the content item corresponding to the selected content-corresponding image has been previously selected by the user, the processing including obtaining certain of the obtain-target data at one or more of the locations specified in the location data of the channel data correlated to the selected content-corresponding image, such that the one or more locations are external to the information processing device on the packet switched network and are dependent on whether the content item corresponding to the selected content-corresponding image has been previously selected by the user, and outputting the obtained obtain-target data.

2. The information processing device according to claim 1, wherein the screen image output unit outputs a screen image showing a picture in which the plurality of content-corresponding images are placed in an order determined based on history of using the contents.

3. The information processing device according to claim 1, wherein
    the screen image output unit, under the condition that a given one of the plurality of content items corresponding to a given one of the content-corresponding images is available for use, outputs the content-corresponding image so as to be correlated to information to an effect that the content item is available for use, and
    under the condition that the content-corresponding image that is output so as to be correlated to the information to the effect that the content item is available for use is selected by the user and a request for using the content item corresponding to the content-corresponding image is received, the processing executing unit executes a processing necessary for the user to use the content item.

4. The information processing device according to claim 3, wherein
    the content item is a program,
    the screen image output unit, under the condition that the program corresponding to the content-corresponding image is executable, outputs the content-corresponding image so as to be correlated to information to an effect that the program corresponding to the content-corresponding image is executable, and
    under the condition that the content-corresponding image that is output so as to be correlated to the information to the effect that the program corresponding to the content-corresponding image is executable is selected by the user and a request for executing the program corresponding to the content-corresponding image is received, the processing executing unit executes a processing of executing the program.

5. The information processing device according to claim 1, wherein the screen image output unit outputs the screen image showing the picture in which the respective content-corresponding images are placed according to data that is updated upon use of the respective contents.

6. An information processing method, comprising:
    obtaining channel data, the channel data including: (i) a plurality of content-corresponding images, each of the content-corresponding images corresponding to one of a plurality of respective content items, and (ii) location data indicating a plurality of locations on a packet switched network where respective obtain-target data for each of the respective content items are located, where the respective content-corresponding images are correlated to certain of the location data, where the obtain-target data for at least one of the content items includes a respective, and different, obtain target data located at each of a number of different locations among the plurality of locations, and where the channel data are updated based whether one or more of the respective content items are selected by a user of an information processing device;
    outputting a screen image showing a picture in which a plurality of the respective content-corresponding images are simultaneously placed; and
    executing a processing that corresponds to a user-selected one of the content-corresponding images and is based on the channel data, such that the processing varies based on whether the content item corresponding to the selected content-corresponding image has been previously selected by the user, the processing including obtaining certain of the obtain-target data at one or more of the locations specified in the location data of the channel data correlated to the selected content-corresponding image, such that the one or more locations are external to the information processing device on the packet switched network and are dependent on whether the content item corresponding to the selected content-corresponding image has been previously selected by the user, and outputting the obtained obtain-target data.

7. A non-transitory, computer readable information storage medium storing a program for causing a computer to function as:
    an obtaining unit configured to obtain channel data, the channel data including: (i) a plurality of content-corresponding images, each of the content-corresponding images corresponding to one of a plurality of respective content items, and (ii) location data indicating a plurality of locations on a packet switched network where respective obtain-target data for each of the respective content items are located, where the respective content-corresponding images are correlated to certain of the location data, where the obtain-target data for at least one of the content items includes a respective, and different, obtain target data located at each of a number of different locations among the plurality of locations, and where the channel data are updated based whether one or more of the respective content items are selected by a user of an information processing device;

a screen image output unit configured to output a screen image showing a picture in which a plurality of the respective content-corresponding images are simultaneously placed; and a processing executing unit configured to execute a processing that corresponds to a user-selected one of the content-corresponding images and is based on the channel data, such that the processing varies based on whether the content item corresponding to the selected content-corresponding image has been previously selected by the user, the processing including obtaining certain of the obtain-target data at one or more of the locations specified in the location data of the channel data correlated to the selected content-corresponding image, such that the one or more locations are external to the information processing device on the packet switched network and are dependent on whether the content item corresponding to the selected content-corresponding image has been previously selected by the user, and outputting the obtained obtain-target data.

8. A computer having a microprocessor and a non-transitory, computer readable storage medium containing a program, where the microprocessor operates to execute the program and thereby causes the computer to execute actions, comprising:

obtaining channel data, the channel data including: (i) a plurality of content-corresponding images, each of the content-corresponding images corresponding to one of a plurality of respective content items, and (ii) location data indicating a plurality of locations on a packet switched network where respective obtain-target data for each of the respective content items are located, where the respective content-corresponding images are correlated to certain of the location data, where the obtain-target data for at least one of the content items includes a respective, and different, obtain target data located at each of a number of different locations among the plurality of locations, and where the channel data are updated based whether one or more of the respective content items are selected by a user of an information processing device;

outputting a screen image showing a picture in which a plurality of the respective content-corresponding images are simultaneously placed; and executing a processing that corresponds to a user-selected one of the content-corresponding images and is based on the channel data, such that the processing varies based on whether the content item corresponding to the selected content-corresponding image has been previously selected by the user, the processing including obtaining certain of the obtain-target data at one or more of the locations specified in the location data of the channel data correlated to the selected content-corresponding image, such that the one or more locations are external to the information processing device on the packet switched network and are dependent on whether the content item corresponding to the selected content-corresponding image has been previously selected by the user, and outputting the obtained obtain-target data.

* * * * *